(12) United States Patent
Kawabata et al.

(10) Patent No.: US 12,275,477 B2
(45) Date of Patent: Apr. 15, 2025

(54) STRADDLED VEHICLE

(71) Applicant: YAMAHA HATSUDOKI KABUSHIKI KAISHA, Iwata (JP)

(72) Inventors: Tomohiro Kawabata, Shizuoka (JP); Masami Sudayama, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 687 days.

(21) Appl. No.: 17/562,155

(22) Filed: Dec. 27, 2021

(65) Prior Publication Data

US 2022/0204109 A1     Jun. 30, 2022

(30) Foreign Application Priority Data

Dec. 29, 2020  (JP) .................................. 2020-219794

(51) Int. Cl.
| | |
|---|---|
| *B62J 17/10* | (2020.01) |
| *B62J 35/00* | (2006.01) |
| *B62J 40/00* | (2020.01) |
| *B62J 40/10* | (2020.01) |
| *B62K 11/14* | (2006.01) |

(52) U.S. Cl.
CPC .............. *B62J 17/10* (2020.02); *B62J 35/00* (2013.01); *B62J 40/00* (2020.02); *B62J 40/10* (2020.02); *B62K 11/14* (2013.01)

(58) Field of Classification Search
CPC . B62J 17/10; B62J 40/00; B62J 35/00; B62K 11/14
USPC ....................................................... 180/229
See application file for complete search history.

(56) References Cited

U.S. PATENT DOCUMENTS

| | | | | |
|---|---|---|---|---|
| 4,648,474 A | * | 3/1987 | Shinozaki | F02M 35/162 180/69.24 |
| 4,913,256 A | * | 4/1990 | Sakuma | B62J 17/10 180/68.1 |
| 6,619,415 B1 | * | 9/2003 | Hasumi | B62J 17/10 180/68.1 |
| 2006/0261590 A1 | * | 11/2006 | Miyamoto | B62J 35/00 280/835 |
| 2013/0081896 A1 | * | 4/2013 | Nakamura | B62J 17/02 180/229 |

(Continued)

FOREIGN PATENT DOCUMENTS

JP      2007-131030 A      5/2007

*Primary Examiner* — Jacob D Knutson
*Assistant Examiner* — Morgan Rappe
(74) *Attorney, Agent, or Firm* — Rabin & Berdo, P.C.

(57) ABSTRACT

A straddled vehicle including a body frame having a head pipe, a front cover in front of the head pipe, an exterior cover laterally covering the body frame, a fuel tank disposed behind the head pipe, an air cleaner disposed directly below the fuel tank, a duct disposed between the front cover and the head pipe and extending from an opening in the front cover, and a wind guide cover disposed between the head pipe and the fuel tank. The fuel tank and the exterior cover forms a wind guide pathway therebetween, the wind guide pathway being directly below the fuel tank, and being laterally covered with the exterior cover. The wind guide cover is configured to lead traveling wind passing through the duct from the opening to the wind guide pathway, so that the wind guide pathway leads the traveling wind to an air intake port of the air cleaner.

10 Claims, 10 Drawing Sheets

(56) References Cited

U.S. PATENT DOCUMENTS

2016/0091031 A1* 3/2016 Nakano .................. F16D 13/74
  192/70.12
2016/0368369 A1* 12/2016 Nakayama ............... B62J 17/10
2018/0118295 A1* 5/2018 Haraguchi ............... B62J 17/10

* cited by examiner

STRADDLED VEHICLE

CROSS-REFERENCE TO RELATED APPLICATIONS

This application is based on, and claims priority from, Japanese Patent Application No. 2020-219794, filed on Dec. 29, 2020. The contents of the application is incorporated herein by reference.

FIELD OF THE INVENTION

The present invention relates to a straddled vehicle.

BACKGROUND INFORMATION

A type of straddled vehicle well-known so far is so-called a naked type in which an air intake port of an air cleaner is provided behind a fuel tank (see Japan Laid-open Patent Application Publication No. 2007-131030).

SUMMARY

For example, when so-called a full cowl type vehicle is manufactured based on the straddled vehicle disclosed in Japan Laid-open Patent Application Publication No. 2007-131030, heat discharged from an engine and/or so forth flows into the interior of the vehicle, whereby increase in temperature undesirably occurs in the vicinity of the air intake port of the air cleaner. Increase in temperature in the vicinity of the air intake port of the air cleaner causes reduction in oxygen density. This poses as a factor of degradation in power of the engine.

It is an object of the present invention to inhibit increase in temperature in the vicinity of an air intake port of an air cleaner in a straddled vehicle that a vehicle body frame thereof is laterally covered with an exterior cover.

A straddled vehicle according to an aspect of the present invention includes a vehicle body frame, a front cover, an exterior cover, a fuel tank, an air cleaner, a duct, a wind guide pathway, a wind guide cover, and a handle crown. The vehicle body frame includes a head pipe. The front cover is disposed in front of the head pipe. The front cover includes an opening configured to take in traveling wind flowing from ahead. The exterior cover laterally covers the vehicle body frame. The fuel tank is disposed behind the head pipe. The air cleaner is disposed directly below the fuel tank. The air cleaner includes an air intake port disposed on a more rear side than the fuel tank. The duct is disposed between the front cover and the head pipe and extends from the opening to a position located in front of the head pipe. The wind guide pathway leads the traveling wind passing through the duct to the air intake port of the air cleaner. The wind guide pathway is disposed directly below the fuel tank and is laterally covered with the exterior cover. The wind guide cover is disposed between the head pipe and the fuel tank and leads the traveling wind passing through the duct to the wind guide pathway. The handle crown is disposed on an upper side than a rear end of the duct and the wind guide cover.

In the straddled vehicle according to the present aspect, the traveling wind, flowing from ahead, is taken in through the opening, passes through the duct, and is led to the air intake port of the air cleaner through the wind guide pathway disposed directly below the fuel tank. With this configuration, the traveling wind, taken in through the opening, efficiently flows to the air intake port of the air cleaner by the duct and the wind guide pathway. Hence, increase in temperature can be inhibited at the air intake port of the air cleaner and the surroundings thereof. Besides, the traveling wind, passing through the duct, is led to the wind guide pathway by the wind guide cover. In other words, the traveling wind, passing through the duct, can be inhibited from flowing to above the vehicle in front of the fuel tank, whereby the traveling wind, flowing through the wind guide pathway, is increased in flow rate. Because of this, increase in temperature can be further inhibited by the wind guide cover at the air intake port of the air cleaner and the surroundings thereof. Furthermore, the traveling wind, passing through the duct, can be inhibited from flowing to above the vehicle in front of the fuel tank as well by the handle crown disposed on an upper side than the duct and the wind guide cover. Besides, the air intake port of the air cleaner is disposed on a more rear side than the fuel tank. Hence, increase in temperature can be more inhibited at the air intake port of the air cleaner and the surroundings thereof than a configuration that the air intake port of the air cleaner is disposed directly below the fuel tank.

A rear end of the handle crown may be disposed on a more rear side than a front end of the wind guide cover. In this case, the traveling wind, passing through the duct, can be further inhibited from flowing to above the vehicle in front of the fuel tank by the handle crown.

The handle crown may overlap the wind guide cover in a vehicle plan view. In this case, the traveling wind, passing through the duct, can be further inhibited from flowing to above the vehicle in front of the fuel tank by the handle crown.

The handle crown may overlap the duct in the vehicle plan view. In this case, the traveling wind, passing through the duct, can be further inhibited from flowing to above the vehicle in front of the fuel tank by the handle crown.

The vehicle body frame may further include a tank support frame made in form of a single frame. The tank support frame may extend rearward from the head pipe and is disposed in a middle of the vehicle in a vehicle width direction. The wind guide cover may be disposed directly above the tank support frame and may have an approximately U shape opened downward in a vehicle front view. In this case, the wind guide cover has the U shape, whereby the traveling wind becomes likely to pass through the right and left lateral sides of the tank support frame. Hence, the traveling wind efficiently flows to the air intake port of the air cleaner.

The duct may have an approximately U shape opened downward in the vehicle front view. In this case, the duct is made simple in structure.

The straddled vehicle may further include a tank cover covering the fuel tank. A rear end of the wind guide cover may overlap a front edge of the tank cover as seen in a vehicle back-and-forth direction. In this case, the traveling wind, led by the wind guide cover, can be inhibited from leaking through a gap between the tank cover and the wind guide cover.

The straddled vehicle may further include the tank cover covering the fuel tank, a stay configured to attach the tank cover to the vehicle body frame, and a support member configured to support the fuel tank. The support member may be attached to the stay. In this case, increase in number of components can be inhibited.

The opening of the front cover may be disposed in the middle of the vehicle in the vehicle width direction. In this case, the traveling wind, flowing from ahead, can be efficiently taken in through the opening.

The duct may function as a meter stay as well. In this case, increase in number of components can be inhibited.

DETAILED DESCRIPTION OF EMBODIMENTS

A preferred embodiment of a straddled vehicle according to an aspect of the present invention will be hereinafter explained with reference to drawings. It should be noted that in the following explanation, terms indicating such directions as "back and forth", "up and down", and "right and left" are explained based on directions seen from a rider in operation of the straddled vehicle. Therefore, a right-and-left direction is synonymous with a vehicle width direction. Besides, the term "outer side in a vehicle width direction" means a side far from the center of the straddled vehicle in the vehicle width direction. By contrast, the term "inner side in the vehicle width direction" means a side near to the center of the straddled vehicle in the vehicle width direction.

Figure 1:
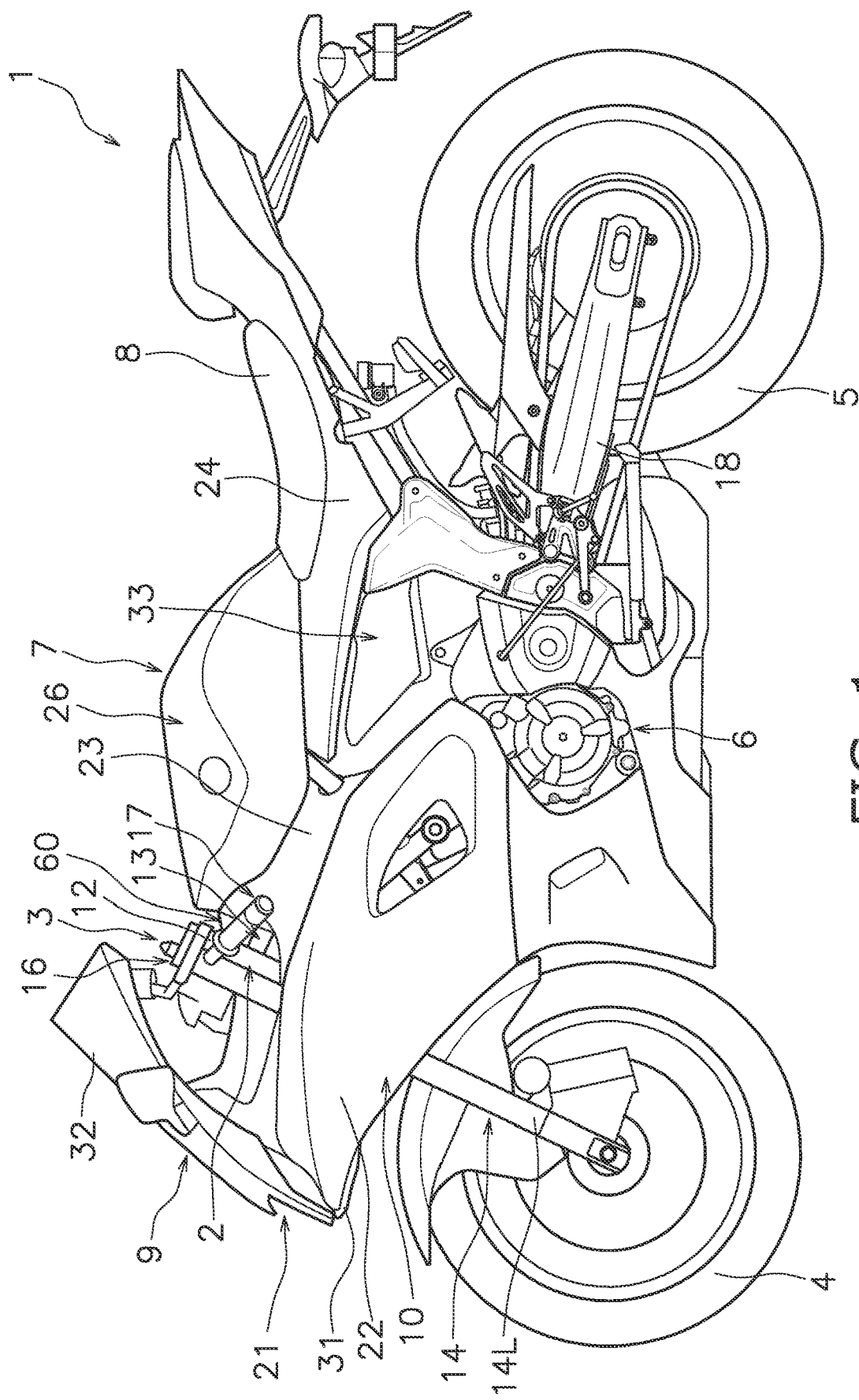
FIG. 1 is a left side view of a straddled vehicle.

FIG. 1 is a left side view of a straddled vehicle 1. The straddled vehicle 1 includes a vehicle body frame 2, a steering device 3, a front wheel 4, a rear wheel 5, an engine 6, a fuel tank 7, a seat 8, a front cover 9, and an exterior cover 10.

The vehicle body frame 2 includes a head pipe 12 and a main frame 13. The head pipe 12 extends forward and downward from the upper end thereof to the lower end thereof in a vehicle side view. The head pipe 12 is disposed in the middle of the vehicle in the vehicle width direction.

The main frame 13 is connected to the head pipe 12 and extends therefrom rearward. It should be noted that the term "connection" is not limited to direct connection and encompasses indirect connection. Besides, the term "connection" is not limited to a condition that separate members are fixed to each other and encompasses a condition that a plurality of portions in an integrated member continue to each other.

Figure 2:
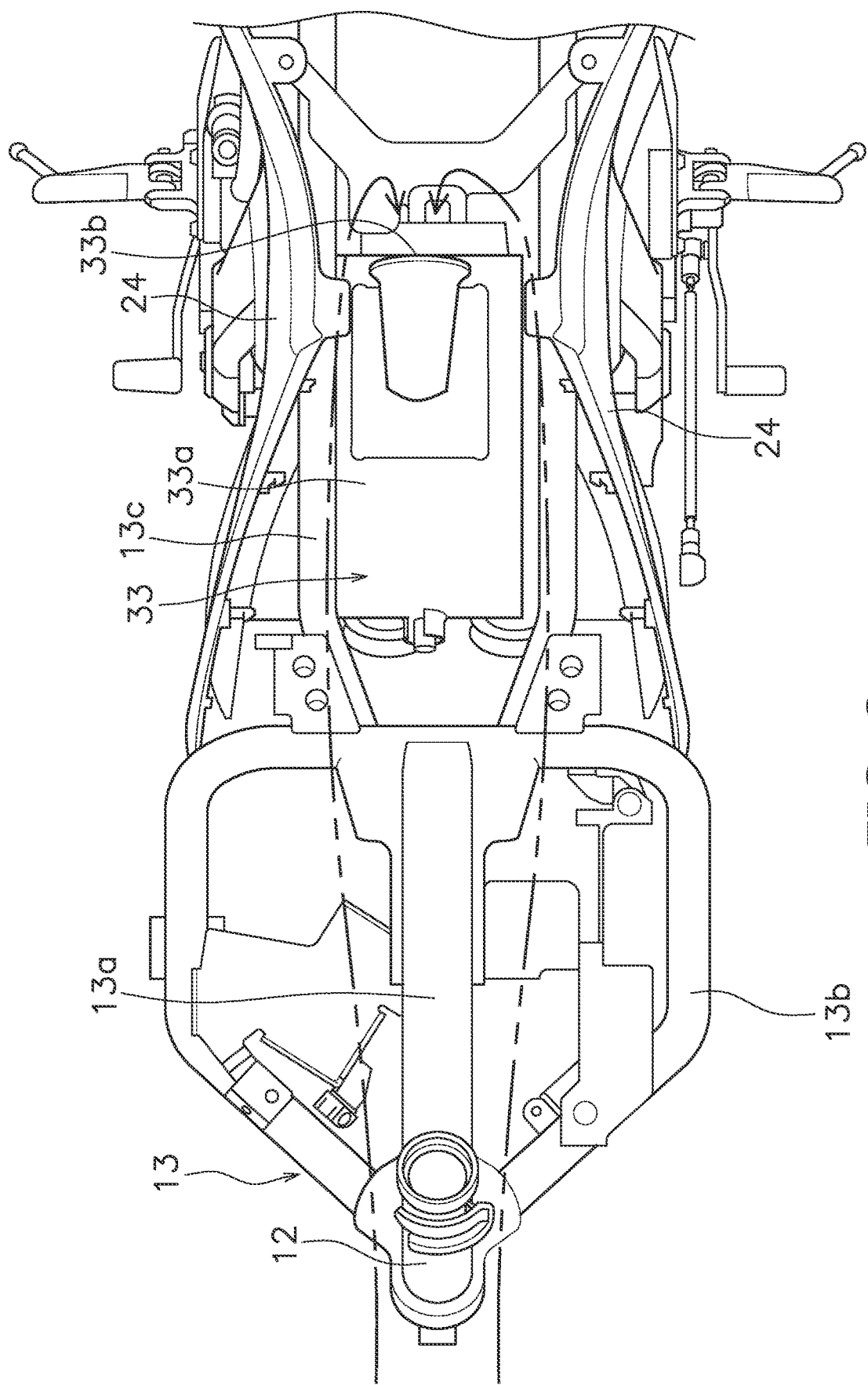
FIG. 2 is a view of a vehicle body frame and the surroundings thereof as seen from above.

FIG. 2 is a view of the vehicle body frame 2 and the surroundings thereof as seen from above. FIG. 2 omits illustration of the engine 6, the fuel tank 7, the seat 8, and so forth. The main frame 13 includes a tank support frame 13a made in form of a single frame, an engine support frame 13b, and a rear frame 13c.

The tank support frame 13a extends rearward from the head pipe 12. The tank support frame 13a is disposed directly below the fuel tank 7 in the middle of the vehicle in the vehicle width direction and supports the fuel tank 7. The engine support frame 13b is disposed on a lower side than the tank support frame 13a. The engine support frame 13b extends rearward from the head pipe 12, while branching therefrom right and left. The engine support frame 13b is connected at the branched rear ends thereof to the rear end of the tank support frame 13a. The rear frame 13c extends rearward from the rear end of the tank support frame 13a, while branching therefrom right and left.

Figure 3:
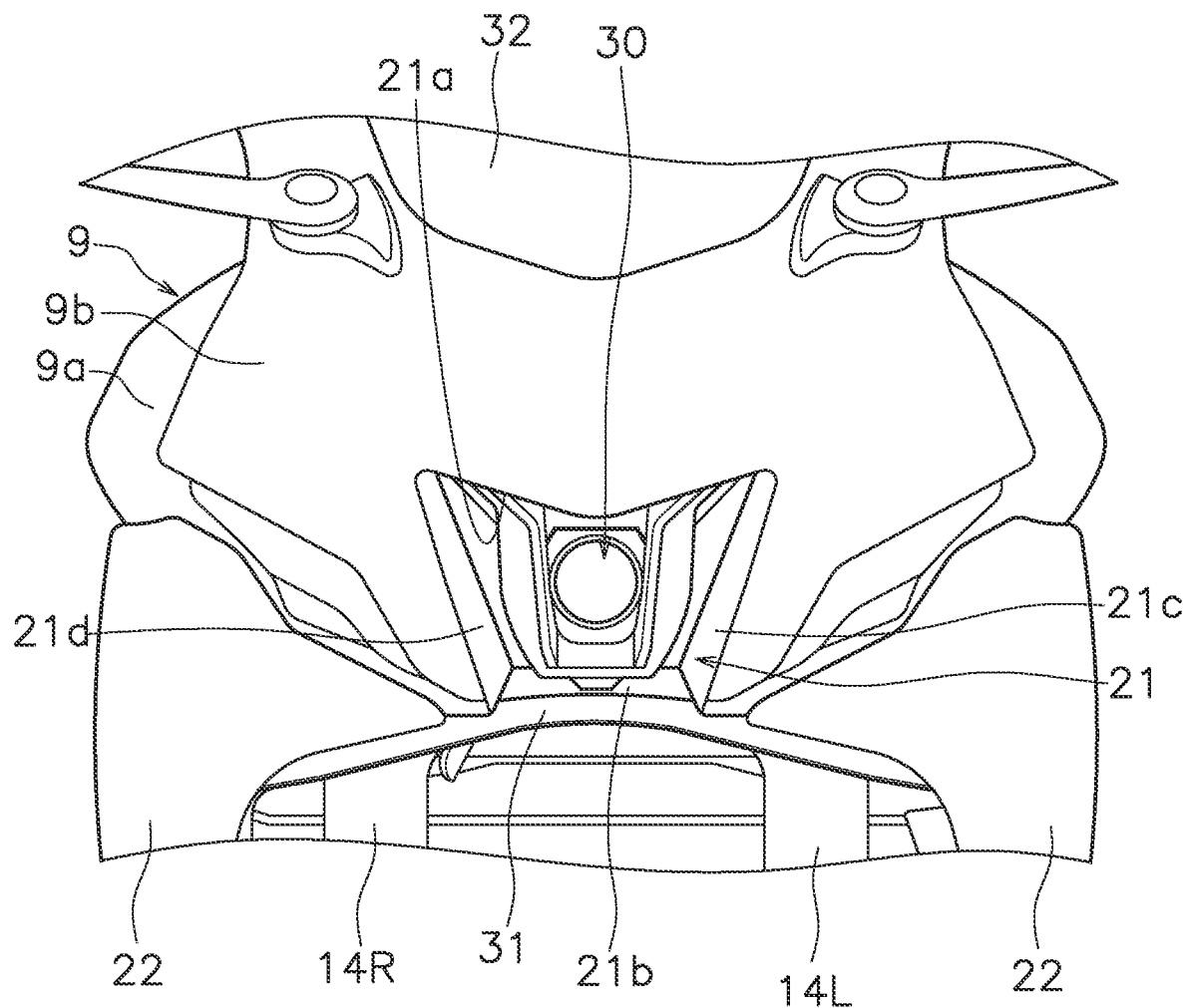
FIG. 3 is a partial front view of the straddled vehicle.
Figure 4:
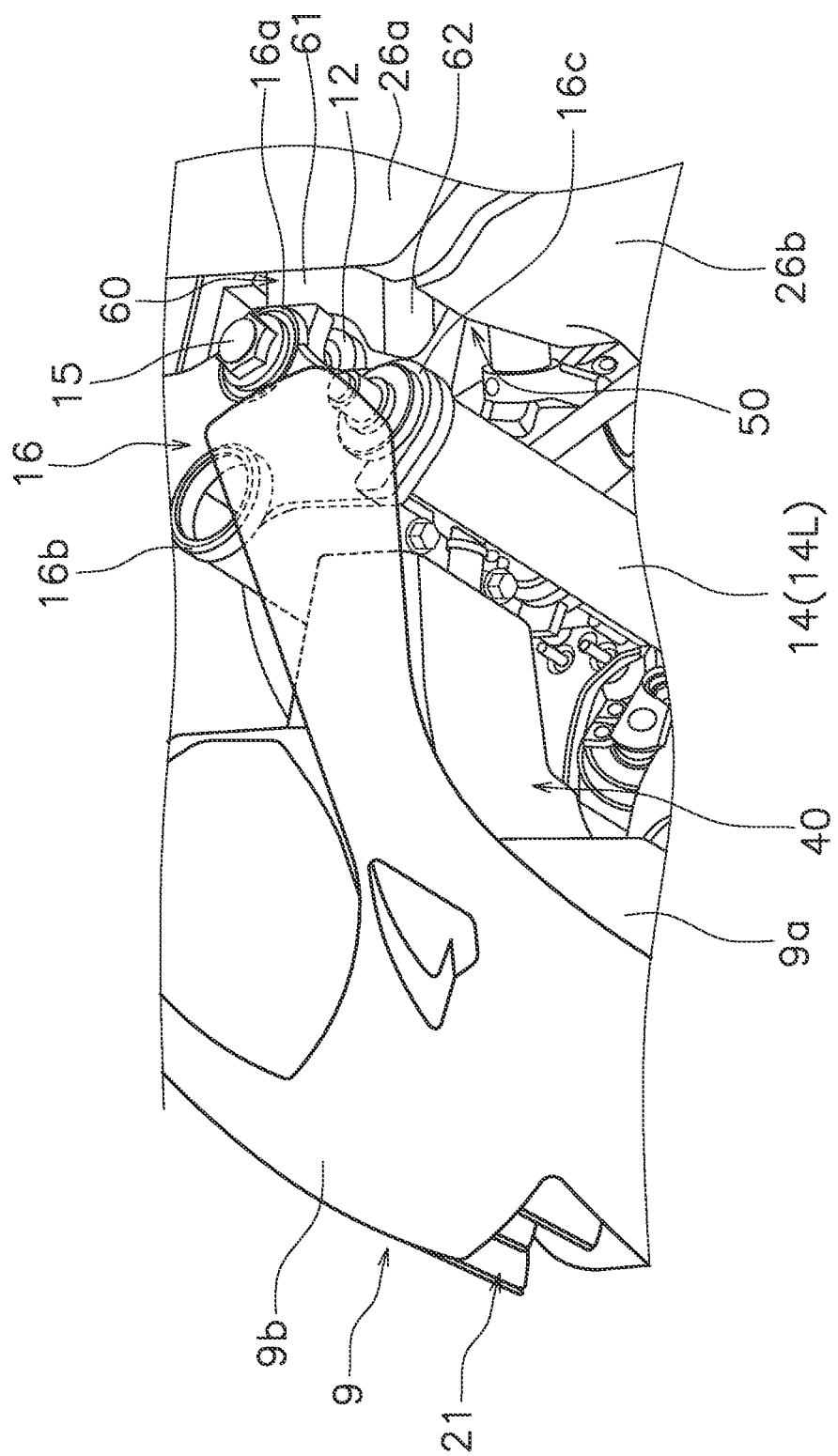
FIG. 4 is a perspective view of a steering device and the surroundings thereof.

FIG. 3 is a partial front view of the straddled vehicle 1. FIG. 4 is a perspective view of the steering device 3 and the surroundings thereof. As shown in FIGS. 1, 3, and 4, the steering device 3 includes a front fork 14, a steering shaft 15, a handle crown 16, and a handle 17. The front fork 14 is supported by the head pipe 12 so as to be turnable. FIG. 3 is a partial front view of the straddled vehicle 1. The front fork 14 includes a pair of right and left front suspensions 14R and 14L. The pair of right and left front suspensions 14R and 14L extends forward and downward from the upper ends thereof to the lower ends thereof in the vehicle side view. The steering shaft 15 is inserted into the head pipe 12 and is supported by the head pipe 12 so as to be turnable.

The handle crown 16 is disposed directly above the head pipe 12. The handle crown 16 is attached to an upper portion of the steering shaft 15. The handle crown 16 couples the pair of right and left front suspensions 14R and 14L. The handle crown 16 includes a shaft attached portion 16a, a switch attached portion 16b, and a pair of right and left fork attached portions 16c.

The shaft attached portion 16a, the switch attached portion 16b, and the pair of right and left fork attached portions 16c are circular holes shaped to penetrate the handle crown 16 in the up-and-down direction. The shaft attached portion 16a is disposed directly above the head pipe 12. The steering shaft 15 is attached the shaft attached portion 16a. An ignition switch (not shown in the drawings) is attached the switch attached portion 16b. The switch attached portion 16b is disposed in front of the shaft attached portion 16a. The pair of right and left fork attached portions 16c allows the front fork 14 to be attached thereto. The handle 17 is connected to the upper portion of the steering shaft 15 through the handle crown 16.

The front wheel 4 is supported by the front fork 14 so as to be rotatable. The front wheel 4 is coupled to the lower ends of the pair of right and left front suspensions 14R and 14L. The rear wheel 5 is supported by a swing aim 18 disposed behind the engine 6 so as to be rotatable.

The engine 6 is supported by the vehicle body frame 2. The engine 6 is attached to the engine support frame 13b of the main frame 13. The engine 6 is disposed directly below the fuel tank 7.

Figure 5:
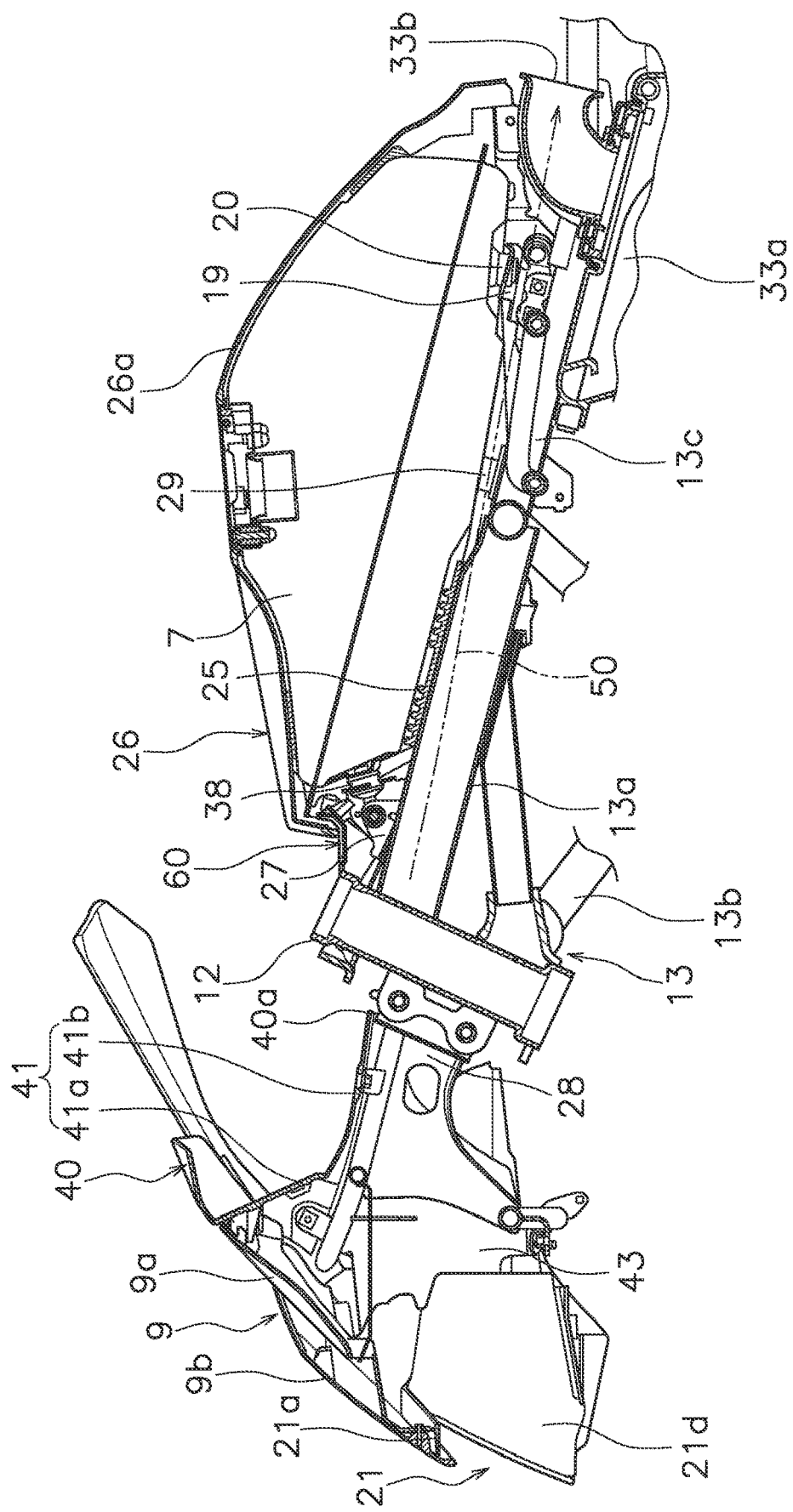
FIG. 5 is a partial cross-sectional view of the straddled vehicle.

FIG. 5 is a partial cross-sectional view of the straddled vehicle 1 taken along a plane arranged orthogonal to the vehicle width direction. The fuel tank 7 is disposed behind the head pipe 12. The fuel tank 7 is disposed directly above the tank support frame 13a and the rear frame 13c. The fuel tank 7 is supported at a front lower portion thereof by the tank support frame 13a through a shock-absorbing material 25 attached to an upper portion of the tank support frame 13a. The fuel tank 7 is supported at a middle lower portion thereof by the rear frame 13c through a shock-absorbing material 29. Besides, the fuel tank 7 is supported at a rear lower portion thereof by the rear frame 13c through a support member 20 on a bracket 19 attached to an upper portion of the rear frame 13c. The support member 20 is, for instance, a grommet made of rubber elastically deformable.

The seat 8 is disposed behind the fuel tank 7. The seat 8 is disposed directly above the rear frame 13c and is supported by the rear frame 13c.

The front cover 9 is disposed in front of the head pipe 12. The front cover 9 is disposed in the middle of the vehicle in the vehicle width direction. As shown in FIGS. 3 to 5, the front cover 9 includes a cover body 9a and an outer cover 9b. As shown in FIG. 5, the cover body 9a is supported by a stay 28 extending forward from the head pipe 12. The outer cover 9b is disposed in front of the cover body 9a. The outer cover 9b is fixed to the cover body 9a so as to cover a portion of the cover body 9a from front. The front cover 9 includes an opening 21 configured to take in traveling wind flowing from ahead. The opening 21 is provided in the distal end of the front cover 9 in the middle of the vehicle in the vehicle width direction. The opening 21 is formed over the cover body 9a and the outer cover 9b. As shown in FIG. 3, the opening 21 has an approximately isosceles trapezoidal shape in a vehicle front view and extends in the back-and-forth direction.

The opening 21 includes first to fourth surfaces 21a to 21d. The first to fourth surfaces 21a to 21d are surfaces located on upper, lower, right, and left sides in the opening 21. The first to fourth surfaces 21a to 21d extend in the back-and-forth direction. In each third/fourth surface 21c, 21d, a lower portion thereof is disposed on a more inner side than an upper portion thereof in the vehicle width direction. In each third/fourth surface 21c, 21d, a rear portion thereof is disposed on a more inner side than a front portion thereof in the vehicle width direction.

A headlight 30 is disposed inside the opening 21. The headlight 30 is disposed inside the opening 21 such that gaps are produced therebetween in the up-and-down direction and the right-and-left direction. In other words, the gaps are produced between the headlight 30 and the first to fourth surfaces 21a to 21d, respectively. The headlight 30 is attached to the stay 28 through an elastic member made of rubber or so forth. An aero-stabilizing plate 31 is disposed directly below the front cover 9. The aero-stabilizing plate 31 generates a downforce by utilizing the traveling wind flowing from ahead. The aero-stabilizing plate 31 extends to more outer sides than the pair of right and left front suspensions 14R and 14L in the vehicle width direction. A wind shield 32 is attached to an upper portion of the front cover 9.

As shown in FIG. 1, the exterior cover 10 laterally covers the vehicle body frame 2. The exterior cover 10 includes a pair of right and left front side covers 22, a pair of right and left side covers 23, and a pair of right and left rear side covers 24.

The pair of front side covers 22 is laterally disposed right and left of the front fork 14. The pair of front side covers 22 covers a portion of the front fork 14 from the outer sides in the vehicle width direction. The front ends of the pair of front side covers 22 are disposed directly below the front cover 9. The pair of front side covers 22 extends to positions located directly below the fuel tank 7 in the vehicle side view and covers at least a portion of the engine support frame 13b from the outer sides in the vehicle width direction.

The pair of side covers 23 is laterally disposed right and left of the tank support frame 13a. The pair of side covers 23 covers the tank support frame 13a from the outer sides in the vehicle width direction. The pair of side covers 23 is disposed between the fuel tank 7 and the pair of front side covers 22 in the vehicle side view.

The pair of rear side covers 24 is disposed behind the pair of front side covers 22 and the pair of side covers 23. The pair of rear side covers 24 is laterally disposed right and left of the rear frame 13c. The pair of rear side covers 24 covers the rear frame 13c from the outer sides in the vehicle width direction. The pair of rear side covers 24 is disposed directly below the fuel tank 7 and the seat 8 in the vehicle side view.

Figure 6:
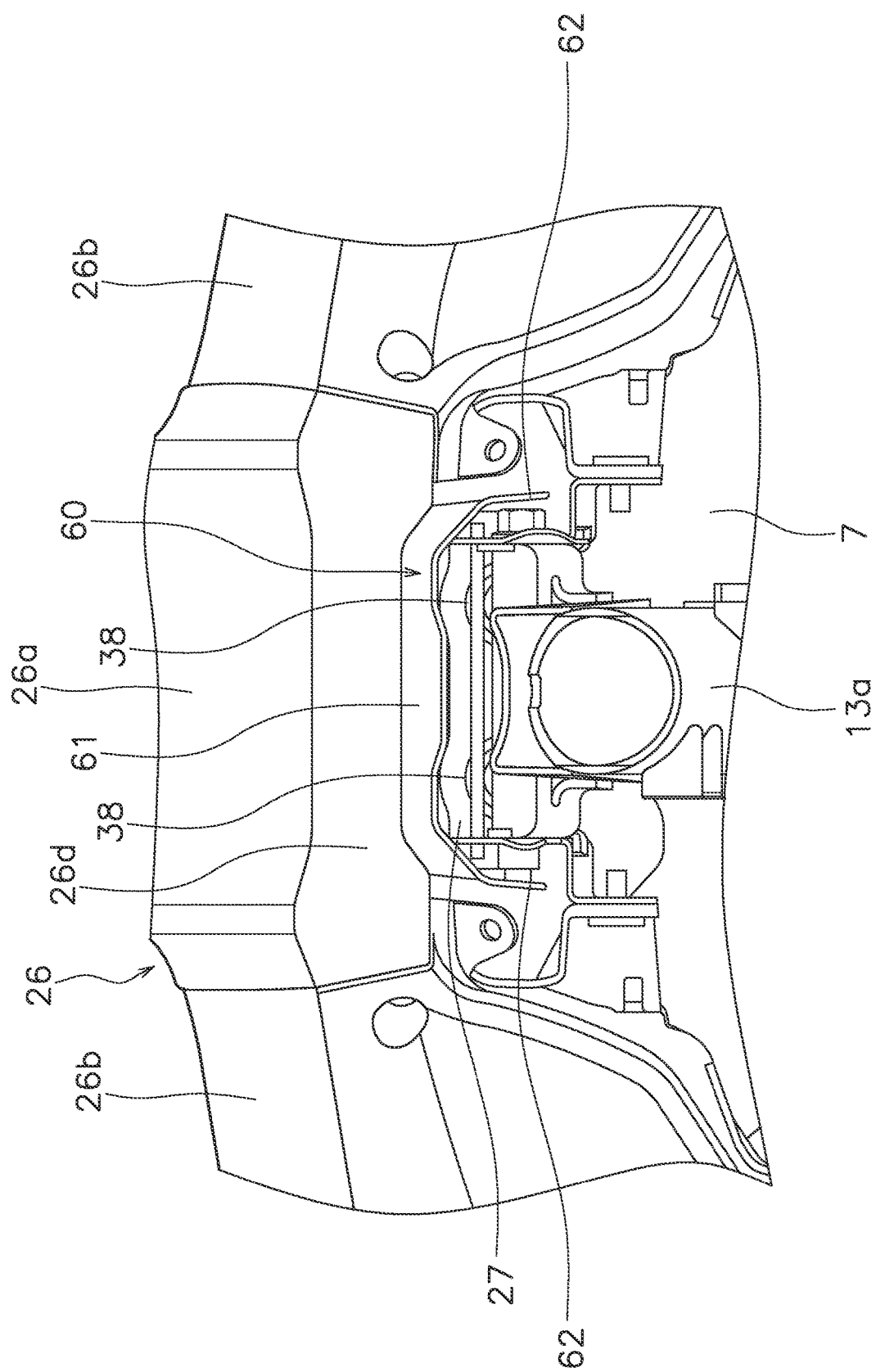
FIG. 6 is a view of a tank cover and the surroundings thereof as seen from front.

The straddled vehicle 1 includes a tank cover 26 and a stay 27. The tank cover 26 covers the fuel tank 7 from above and lateral sides. FIG. 6 is a view of the tank cover 26 and the surroundings thereof as seen from front. The tank cover 26 includes a first tank cover 26a and a pair of right and left second tank covers 26b. The first tank cover 26a is disposed directly above and behind the fuel tank 7. The pair of second tank covers 26b is laterally disposed right and left of the fuel tank 7. The pair of second tank covers 26b is disposed directly above the pair of side covers 23 and the pair of rear side covers 24.

The stay 27 is provided to attach the tank cover 26 to the vehicle body frame 2. The stay 27 is fixed to an upper portion of the tank support frame 13a in an adjacent position to the head pipe 12. A front portion of the tank cover 26 is fixed to the vehicle body frame 2 through the stay 27. A rear portion of the tank cover 26 is fixed to the vehicle body frame 2 through the bracket 19. At least one support member 38 is attached to the stay 27 in order to support the fuel tank 7. In the present preferred embodiment, two support members 38 are provided on both sides of the tank support frame 13a in the right-and-left direction. Each support member 38 is, for instance, a grommet made of rubber elastically deformable.

The straddled vehicle 1 includes an air cleaner 33. The air cleaner 33 is connected to the engine 6. The air cleaner 33 is disposed behind the front side covers 22 in the vehicle side view. The air cleaner 33 includes a body 33a and an air intake port 33b. The body 33a is disposed directly below the fuel tank 7 and the rear frame 13c. The body 33a is disposed directly below the rear side covers 24 in the vehicle side view. The air intake port 33b is opened rearward. The air intake port 33b is disposed behind the tank support frame 13a. The air intake port 33b is disposed on a more rear side than the fuel tank 7. In the present preferred embodiment, the air intake port 33b is disposed on a slightly rear side than the tank cover 26. The air intake port 33b overlaps the front end of the seat 8 in the up-and-down direction in the vehicle side view. The air intake port 33b is laterally covered with the rear side covers 24 from right and left.

As shown in FIGS. 4 and 5, the straddled vehicle 1 includes a duct 40, a wind guide pathway 50, and a wind guide cover 60. The duct 40 is disposed between the front cover 9 and the head pipe 12. The duct 40 is disposed on a lower side than the upper end of the head pipe 12. The duct 40 extends from the opening 21 to a position located in front of the head pipe 12. The duct 40 covers the stay 28 from the outer sides in the vehicle width direction.

Figure 7:
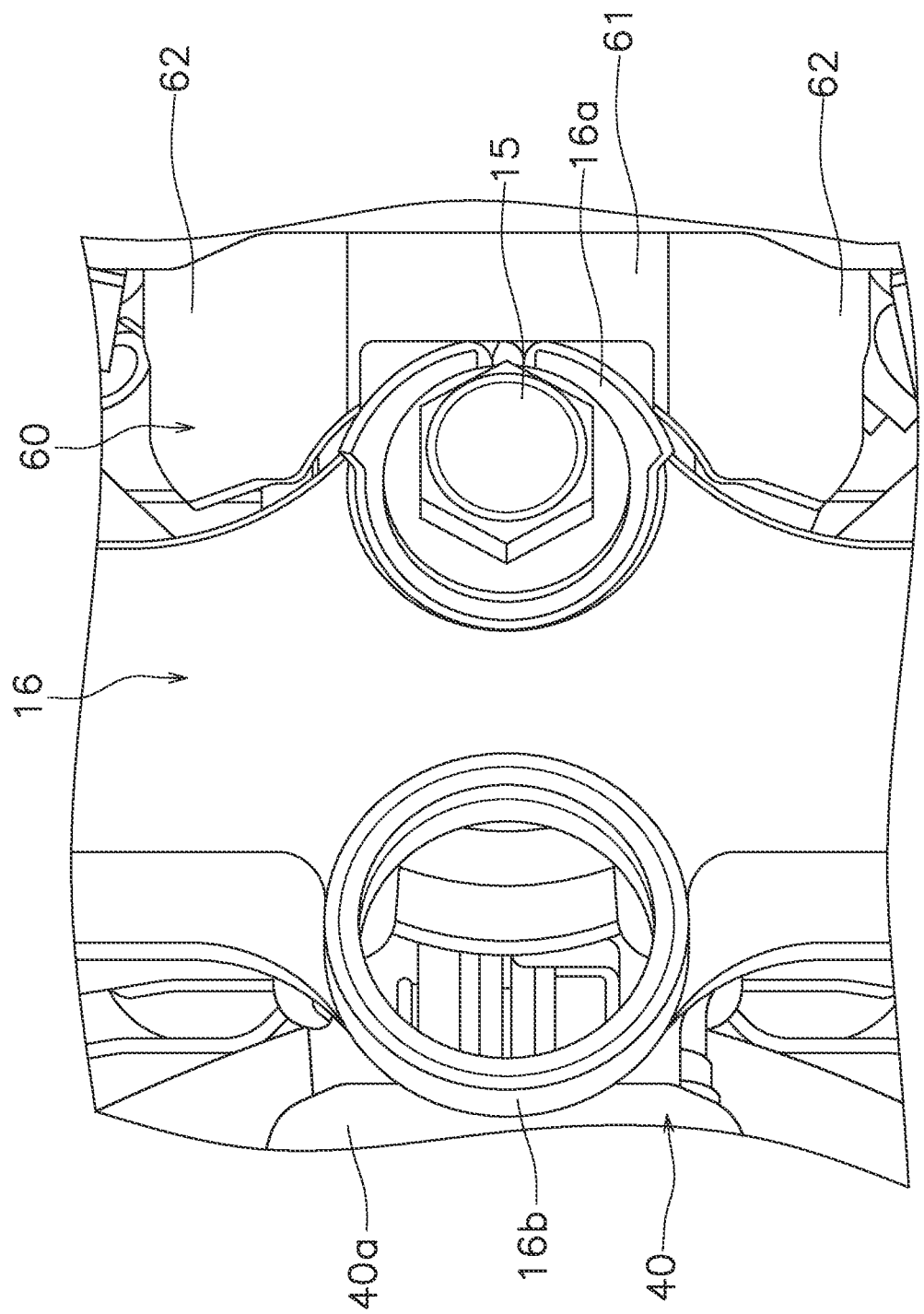
FIG. 7 is a view of a handle crown and the surroundings thereof as seen from above.
Figure 8:
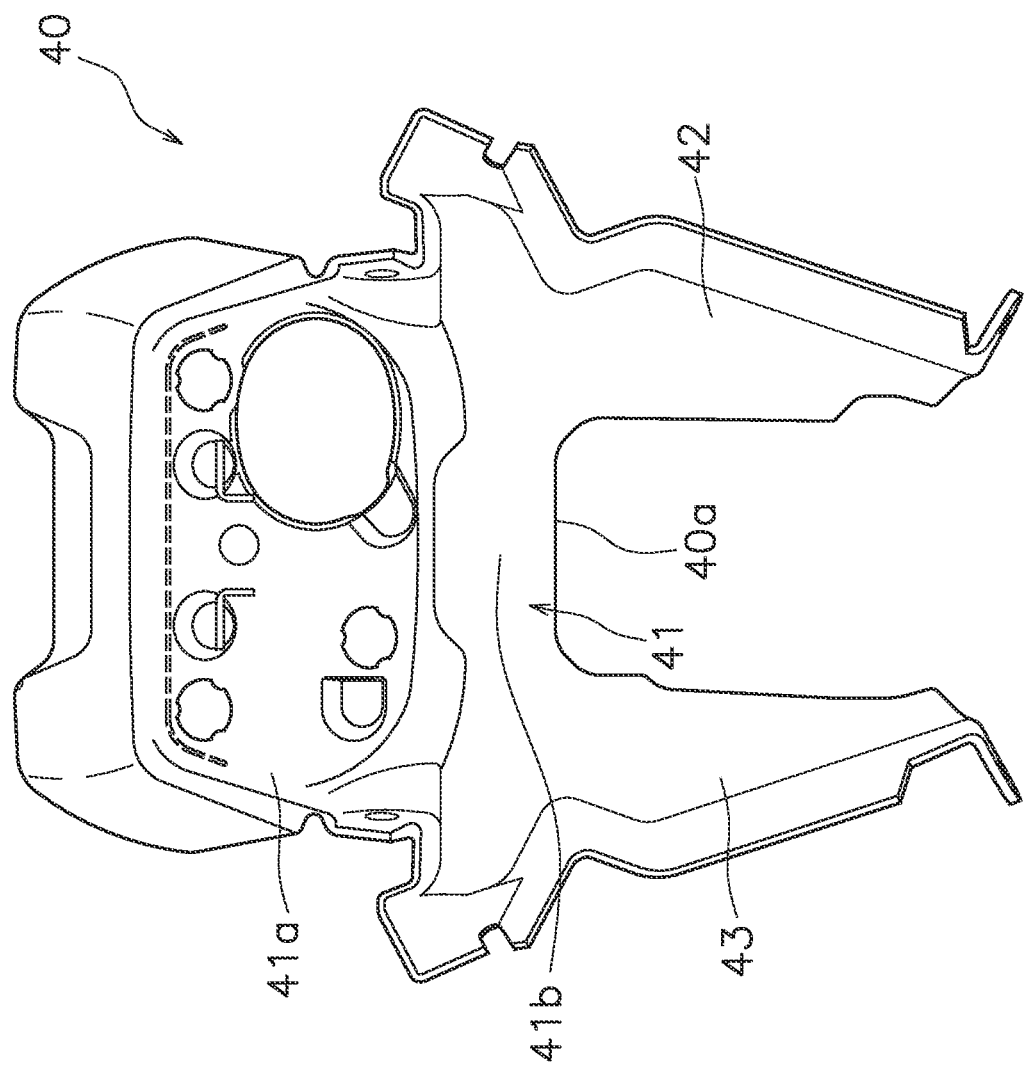
FIG. 8 is a front view of a duct.

FIG. 7 is a view of the handle crown 16 and the surroundings thereof as seen from above. FIG. 8 is a front view of the duct 40. A rear end 40a of the duct 40 is disposed on a more rear side than the front end of the handle crown 16. The handle crown 16 is disposed on an upper side than the rear end 40a of the duct 40. The duct 40 overlaps the handle crown 16 in a vehicle plan view. The duct 40 overlaps the switch attached portion 16b of the handle crown 16 in the vehicle plan view. The duct 40 is attached to the stay 28. In the present preferred embodiment, the duct 40 functions as a meter stay as well.

As shown in FIG. 8, the duct 40 has an approximately U shape opened downward in the vehicle front view. The duct 40 includes an upper surface 41, a left surface 42, and a right surface 43. The upper surface 41 is disposed in the middle of the vehicle in the vehicle width direction. The upper surface 41 includes a front portion 41a and a rear portion 41b. As shown in FIG. 5, the front portion 41a extends rearward and downward toward the rear portion 41b in the vehicle side view. The front portion 41a is a portion that a meter unit (not shown in the drawings) including a tachometer and so forth is disposed. The rear portion 41b extends rearward from the rear end of the front portion 41a. The rear portion 41b is disposed on a lower side than the upper end of the head pipe 12.

The left and right surfaces 42 and 43 are disposed on the outer sides of the stay 28 in the vehicle width direction. The left and right surfaces 42 and 43 are connected to the upper surface 41. The left and right surfaces 42 and 43 extend downward from both right-and-left directional ends of the upper surface 41. The left and right surfaces 42 and 43 extend to a more front side than the upper surface 41. The front ends of the left and right surfaces 42 and 43 extend to a more front side than the rear end of the opening 21 and cover at least a portion of the rear end of the opening 21 from the outer sides in the vehicle width direction. In each left/right surface 42, 43, the front end thereof is disposed on a more outer side than the rear end thereof in the vehicle width direction. In the front end of each left/right surface 42, 43, a lower portion thereof is disposed on a more inner side than an upper portion thereof in the vehicle width direction.

The wind guide pathway 50 leads the traveling wind, passing through the opening 21 and the duct 40, to flow to the air intake port 33b of the air cleaner 33. The wind guide pathway 50 is disposed directly below the fuel tank 7. The wind guide pathway 50 extends from the surroundings of the tank support frame 13a to the air intake port 33b. When described in detail, the wind guide pathway 50 extends rearward further from the surroundings of the tank support frame 13a, passes through a space between the fuel tank 7 and the body 33a of the air cleaner 33, and reaches the air intake port 33b. The wind guide pathway 50 is laterally covered with the exterior cover 10. The wind guide pathway 50 is provided inside the side covers 23 and inside the rear side covers 24. It should be noted that the wind guide pathway 50 is schematically depicted with dashed two-dotted line in FIG. 5.

The wind guide cover 60 leads the traveling wind, passing through the duct 40, to flow to the wind guide pathway 50. The wind guide cover 60 is disposed between the head pipe 12 and the fuel tank 7. The wind guide cover 60 is disposed directly above the tank support frame 13a. The wind guide cover 60 has an approximately U shape opened downward in the vehicle front view. The wind guide cover 60 is fixed to the stay 27.

As shown in FIG. 7, the wind guide cover 60 overlaps the handle crown 16 in the vehicle plan view. The handle crown 16 is disposed on an upper side than the wind guide cover 60. The rear end of the handle crown 16 (the rear end of the shaft attached portion 16a in the present preferred embodiment) is disposed on a more rear side than the front end of the wind guide cover 60.

The wind guide cover 60 includes an upper wall 61, a pair of right and left side walls 62, and a rear end 63. The upper wall 61 covers the distal end of the tank support frame 13a and the surroundings thereof from above. The upper wall 61 more extends in the right-and-left direction than the tank support frame 13a in the vehicle front view. The front end of the upper wall 61 is shaped to be recessed rearward in a circular-arc shape. The front end of the upper wall 61 is disposed on a more front side than the rear end of the handle crown 16. The side walls 62 extend downward from both right-and-left directional ends of the upper wall 61. The side walls 62 are disposed on an upper side than the tank support frame 13a. The side walls 62 more extend downward than the upper end of the head pipe 12. The front ends of the side walls 62 are disposed on a more front side than the rear end of the handle crown 16.

Figure 9:
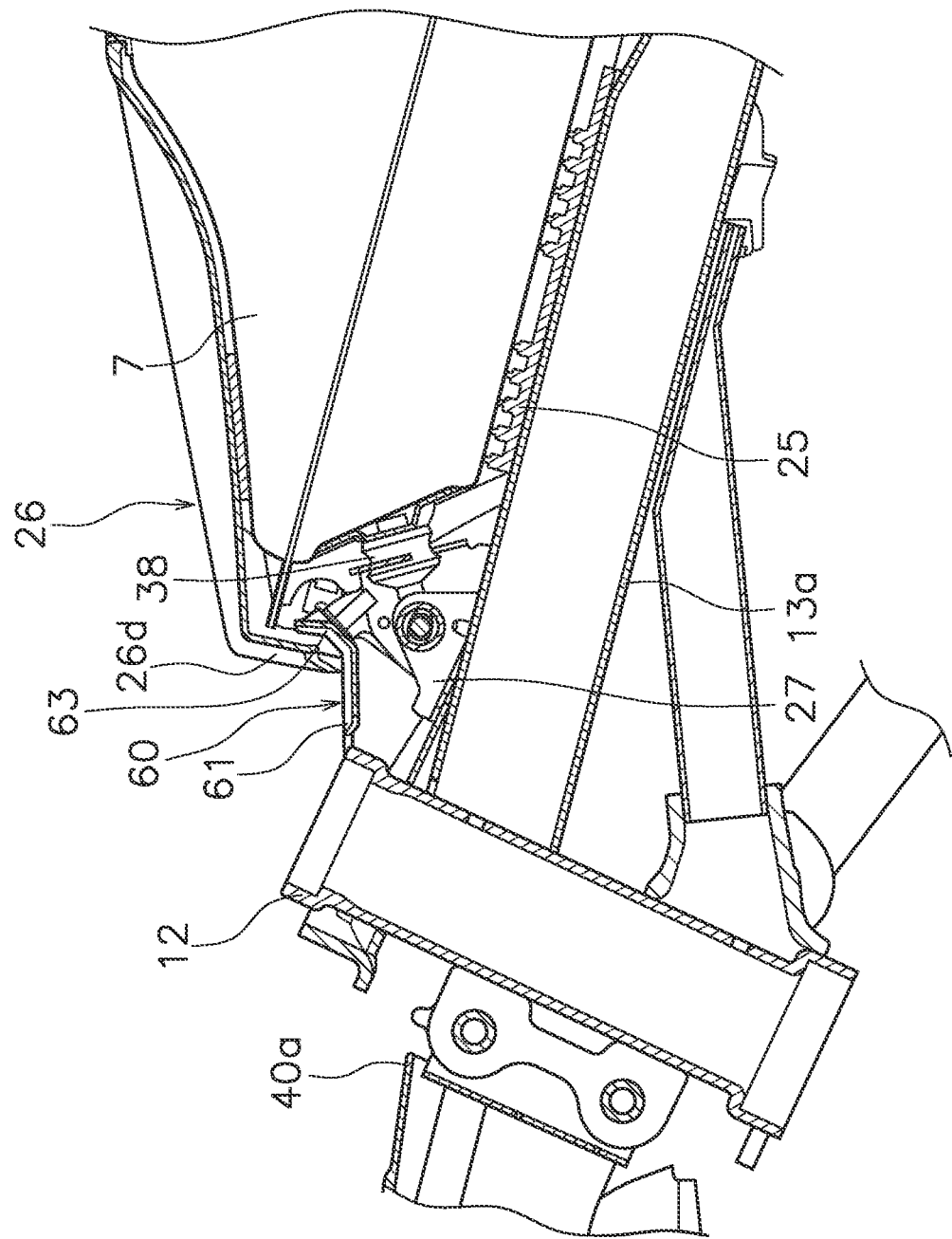
FIG. 9 is an enlarged view of part of FIG. 6.

FIG. 9 is an enlarged view of the wind guide cover 60 and the surroundings thereof shown in FIG. 6. As shown in FIG. 9, the rear end 63 extends upward from a rear portion of the upper wall 61 and rear portions of the side walls 62. The rear end 63 overlaps a front edge 26d of the first tank cover 26a of the tank cover 26 as seen in a vehicle back-and-forth direction. The rear end 63 is disposed on a more rear side than the front edge 26d of the first tank cover 26a. The rear end 63 is fixed to the stay 27 by at least one rivet.

In the straddled vehicle 1 according to the present aspect, the traveling wind, flowing from ahead, is taken in through the opening 21, passes through the duct 40, and is led to the air intake port 33b of the air cleaner 33 through the wind guide pathway 50 disposed directly below the fuel tank 7. With this configuration, the traveling wind, taken in through the opening 21, efficiently flows to the air intake port 33b of the air cleaner 33 by the duct 40 and the wind guide pathway 50. Hence, increase in temperature can be inhibited at the air intake port 33b of the air cleaner 33 and the surroundings thereof.

Figure 10:
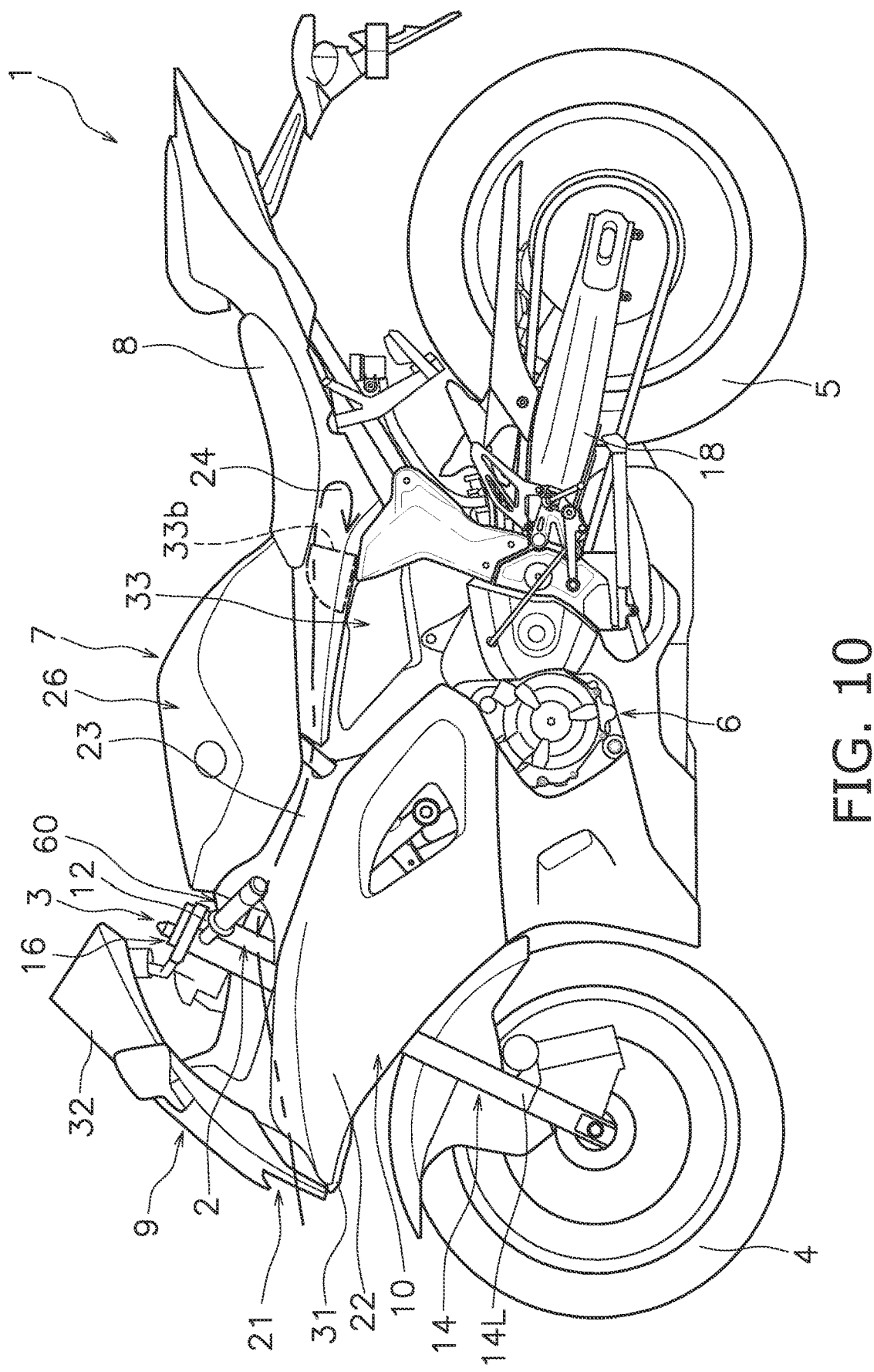
FIG. 10 is a diagram for explaining a flow of traveling wind.

Besides, the traveling wind, passing through the duct 40, is led to the wind guide pathway 50 by the wind guide cover 60. When described in detail, as shown in FIG. 10, the wind guide cover 60 can inhibit the traveling wind from flowing to above the vehicle in front of the fuel tank 7, whereby the traveling wind, flowing through the wind guide pathway 50, is increased in flow rate. Because of this, increase in temperature can be further inhibited by the wind guide cover 60 at the air intake port 33b of the air cleaner 33 and the surroundings thereof. It should be noted that the flow of traveling wind is depicted with dashed two-dotted line in FIG. 10.

Furthermore, the traveling wind, passing through the duct 40, can be inhibited from flowing to above the vehicle in front of the fuel tank 7 as well by the handle crown 16 disposed on an upper side than the duct 40 and the wind guide cover 60. Besides, the air intake port 33b of the air cleaner 33 is disposed on a more rear side than the fuel tank 7. Hence, increase in temperature can be herein more inhibited at the air intake port 33b of the air cleaner 33 and the surroundings thereof than a configuration that the air intake port 33b of the air cleaner 33 is disposed directly below the fuel tank 7.

One preferred embodiment of the present invention has been explained above. However, the present invention is not limited to the preferred embodiment described above, and a variety of changes can be made without departing from the gist of the present invention.

In the preferred embodiment described above, the switch attached portion 16b is designed to be included in the handle crown 16. Alternatively, the switch attached portion 16b may be omitted in the handle crown 16.

The air intake port 33b of the air cleaner 33 may be disposed on a more front side than the tank cover 26. The duct 40 and the wind guide cover 60 may be changed in shape. The duct 40 may be designed not to function as the meter stay. The duct 40 may include a lower surface opposed to the upper surface 41 without being opened downward. Either the side walls 62 or the rear end 63 may be omitted in the wind guide cover 60.

What is claimed is:

1. A straddled vehicle comprising:
   a body frame including a head pipe;

a front cover disposed in front of the head pipe, the front cover including an opening formed therein to take in traveling wind flowing from ahead;

an exterior cover laterally covering the body frame;

a fuel tank disposed behind the head pipe;

an air cleaner disposed directly below the fuel tank, the air cleaner including an air intake port that is disposed further rearward than the fuel tank;

a duct disposed between the front cover and the head pipe, the duct extending from the opening in the front cover to a position located in front of the head pipe, to allow the traveling wind taken in from the opening to pass therethrough;

a wind guide cover disposed between the head pipe and the fuel tank; and a handle crown disposed above a rear end of the duct and the wind guide cover in an up-and-down direction of the straddled vehicle, the handle crown being disposed above the head pipe, wherein the fuel tank and the exterior cover forms a wind guide pathway therebetween, the wind guide pathway being directly below the fuel tank, and being laterally covered with the exterior cover, and the wind guide cover is configured to lead the traveling wind passing through the duct to the wind guide pathway, so that the wind guide pathway leads the traveling wind to the air intake port of the air cleaner.

2. The straddled vehicle according to claim 1, wherein a rear end of the handle crown is disposed further rearward than a front end of the wind guide cover.

3. The straddled vehicle according to claim 1, wherein the handle crown overlaps the wind guide cover in a plan view of the straddled vehicle.

4. The straddled vehicle according to claim 1, wherein the handle crown overlaps the duct in a plan view of the straddled vehicle.

5. The straddled vehicle according to claim 1, wherein the body frame further includes a tank support frame that is a single frame, the tank support frame extending rearward from the head pipe, and being disposed in a middle of the straddled vehicle in a width direction thereof, and the wind guide cover is disposed directly above the tank support frame, and having an approximately U shape opened downward in a front view of the straddled vehicle.

6. The straddled vehicle according to claim 1, wherein the duct has an approximately U shape opened downward in a front view of the straddled vehicle.

7. The straddled vehicle according to claim 1, further comprising:

a tank cover covering the fuel tank, wherein a rear end of the wind guide cover overlaps a front edge of the tank cover in a front view or a rear view of the straddled vehicle.

8. The straddled vehicle according to claim 1, further comprising:

a tank cover covering the fuel tank;

a stay configured to attach the tank cover to the body frame; and a support member attached to the stay, the support member being configured to support the fuel tank.

9. The straddled vehicle according to claim 1, wherein the opening of the front cover is disposed in a middle of the straddled vehicle in a width direction thereof.

10. The straddled vehicle according to claim 1, wherein the duct functions as a meter stay.

* * * * *